(12) United States Patent
Moroney et al.

(10) Patent No.: US 12,455,552 B2
(45) Date of Patent: Oct. 28, 2025

(54) DYNAMIC ELEMENT COMPOSITING

(71) Applicant: Peridot Print LLC, Palo Alto, CA (US)

(72) Inventors: Nathan Moroney, Palo Alto, CA (US); Craig Peter Sayers, Palo Alto, CA (US); Ji Won Jun, Palo Alto, CA (US); Paulo Abner Aurelio Mesquita, Porto Alegre (BR)

(73) Assignee: Peridot Print LLC, Palo Alto, CA (US)

( * ) Notice: Subject to any disclaimer, the term of this patent is extended or adjusted under 35 U.S.C. 154(b) by 393 days.

(21) Appl. No.: 18/022,079

(22) PCT Filed: Aug. 17, 2020

(86) PCT No.: PCT/US2020/046679
§ 371 (c)(1),
(2) Date: Feb. 17, 2023

(87) PCT Pub. No.: WO2022/039715
PCT Pub. Date: Feb. 24, 2022

(65) Prior Publication Data
US 2023/0305523 A1    Sep. 28, 2023

(51) Int. Cl.
*G05B 19/4099* (2006.01)
*B33Y 50/00* (2015.01)
*G06T 17/20* (2006.01)
*G06T 19/20* (2011.01)

(52) U.S. Cl.
CPC .......... *G05B 19/4099* (2013.01); *B33Y 50/00* (2014.12); *G06T 17/20* (2013.01); *G06T 19/20* (2013.01); *G05B 2219/49023* (2013.01); *G06T 2219/2016* (2013.01)

(58) Field of Classification Search
None
See application file for complete search history.

(56) References Cited

U.S. PATENT DOCUMENTS

| | | |
|---|---|---|
| 9,802,364 B2 | 10/2017 | Danks |
| 2012/0113116 A1 | 5/2012 | Luisi et al. |
| 2015/0235069 A1 | 8/2015 | Kumar et al. |
| 2015/0343704 A1 | 12/2015 | Stahl et al. |
| 2016/0337549 A1 | 11/2016 | Nuuja |
| 2016/0361876 A1 | 12/2016 | Kao et al. |
| 2017/0072639 A1 | 3/2017 | Levine et al. |
| 2018/0082163 A1 | 3/2018 | Flores et al. |
| 2018/0186092 A1 | 7/2018 | Nordback |
| 2020/0157384 A1 | 5/2020 | Dinescu |
| 2020/0201948 A1 | 6/2020 | Marshall et al. |

FOREIGN PATENT DOCUMENTS

| | | |
|---|---|---|
| CN | 105938569 A | 9/2016 |
| EP | 1871274 B1 | 5/2019 |
| JP | 2008-531234 A | 8/2008 |

*Primary Examiner* — Sean Shechtman
(74) *Attorney, Agent, or Firm* — Shook, Hardy & Bacon

(57) ABSTRACT

Systems and methods are described herein relating to compositing dynamic content on 3D printed objects. A printing subsystem may transmit printing instructions to a 3D printer that include only a single digital mesh of the object, digital meshes of each discrete element of the dynamic content, and instructions for compositing unique combinations of the discrete elements on each instance of the object or each instance of a set of objects printed by the 3D printer.

11 Claims, 11 Drawing Sheets

DYNAMIC ELEMENT COMPOSITING

BACKGROUND

Three-dimensional (3D) objects may be printed using a 3D printer. 3D-printed objects may be labeled after printing for purposes of tracking production and/or dates. In some instances, each 3D-printed object may be uniquely created to have labeling information that can be printed on an object. As an example, one hundred unique parts may be created using computer-aided drafting (CAD) tools that differ only with respect to labeling. Digital mesh files for each of the one hundred unique parts may then be transmitted to a 3D printer for printing.

Depending on the available internal memory of the 3D printer, the digital mesh files may be sequentially transmitted to the 3D printer during an extended printing session of hours or days. The computer system on which the digital mesh files are stored may remain in communication with the 3D printer during the printing session to ensure each digital mesh file is transmitted for printing.

BRIEF DESCRIPTION OF THE DRAWINGS

The written disclosure herein describes illustrative examples that are nonlimiting and non-exhaustive. Reference is made to certain of such illustrative examples that are depicted in the figures described below.

DETAILED DESCRIPTION

Figure 1:
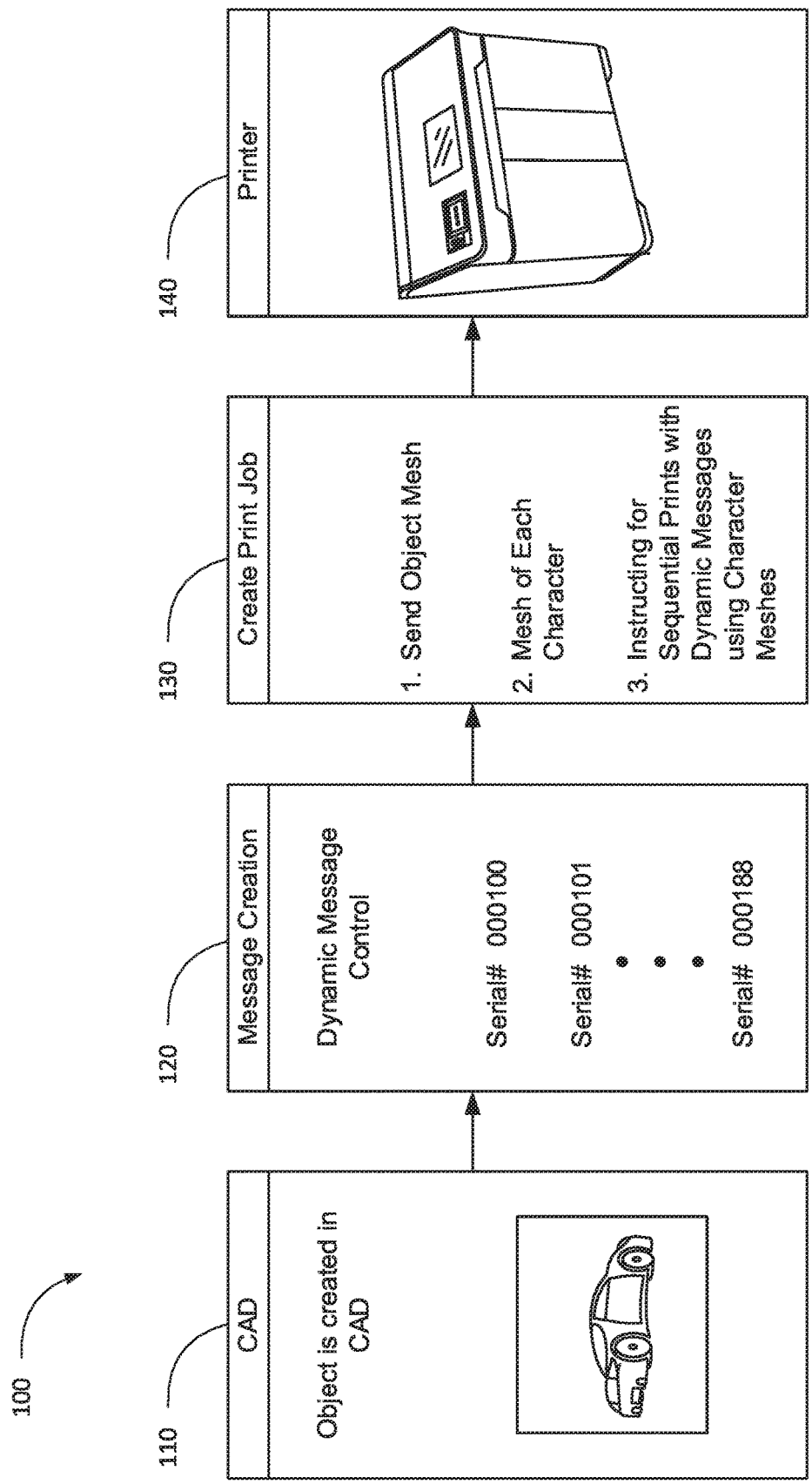
FIG. 1 illustrates a functional block diagram of operations for dynamically compositing elements on a digital mesh for multiple unique 3D prints of an object.

In various examples of the systems and methods described herein, a dynamic compositing system receives a digital mesh of an object to be printed via a three-dimensional (3D) printer. For example, the digital mesh of the object may be created in a computer-aided drafting (CAD) software program. A location of the digital mesh of the object may be annotated or otherwise marked to identify a location or region to receive dynamic content. A content creation subsystem may receive dynamic content to be 3D printed in the identified region of the object.

For example, the user may define the dynamic content to include a two-digit week code identifying the week of the year that each object is printed via the 3D printer. The dynamic content may, in other instances, include customized text, images, patterns, a date, a serial number, a model number, a batch number, personalized information, and/or other dynamic content.

A printing subsystem may transmit print instructions to a 3D printer that includes a single instance of the digital mesh of the object, a digital mesh of each discrete element of the dynamic content, and compositing instructions for compositing a unique combination of the discrete elements of the dynamic content in the identified region of each printing of the object.

In some instances, the 3D printer may print each instance of the object in sequence with the dynamic content specified by the compositing instructions on each successive printing. In other instances, the 3D printer may print multiple instances of the object in parallel, with each printed object having a uniquely composited combination of the discrete elements of the dynamic content, as specified by the compositing instructions.

The 3D printer may, for example, slice the composited digital meshes of the discrete elements and the digital mesh of the object, as specified by the compositing instructions. In some examples, for each printing of the object, the system may implement a geometric transformation of the unique composition of the discrete elements of the dynamic content to fit within the identified region of the printed object. For example, the geometric transformation of the unique composition of discrete elements may include scaling (e.g., resizing) and/or rotating the unique composition of discrete elements and/or each discrete element individually.

In various examples, the digital mesh of each discrete element of the dynamic content may take the form of (i) a positive space digital mesh of the discrete element, (ii) a negative space digital mesh of the discrete element, or (iii) a tile with the discrete element formed thereon (protruding) or therein (engraved).

Various modules, systems, and subsystems are described herein as implementing functions and/or as performing actions. In many instances, modules, systems, and subsystems may be divided into sub-modules, subsystems, or even as sub-portions of subsystems. Modules, systems, and subsystems may be implemented in hardware, software, hardware, and/or combinations thereof.

In some examples, multiple objects may be printed using unique combinations of the same discrete elements of user-specified dynamic content. In such examples, the printing subsystem may transmit a single instance or copy of the digital mesh of each discrete element for the printer to re-use when printing each instance of each of the multiple objects, according to compositing instructions transmitted to the 3D printer. The amount of data and the time to transmit the data to the 3D printer is reduced when sending only a single digital mesh of each object to be printed and only a single digital mesh of each discrete element of the dynamic content. Alternative approaches that generate a unique digital mesh for each object and the associated dynamic content generate and transmit significantly more data to the 3D printer In some examples, the dynamic content to be printed on any number of objects may be provided in the form of instructions to print a numerical form of the current date, which may be known by the 3D printer. In such an example, the dynamic content may comprise discrete elements as the numerals 0-9 and a forward-slash ("/"). The 3D printer may slice a unique combination of the digital meshes of the discrete elements based on the current date.

For example, the date "01/22/2020" may be printed on a specified location of the digital objects printed on that date. By compositing the dynamic content at the time of printing, information such as dates, locations, materials, and the like can be printed on an object. Such information cannot easily be added to an object during the creation of the object using a CAD program since the date, print location, print material, or other such information may not be known at that time.

In another example, the dynamic content may comprise a series of unique personalized names to be printed on any number of objects. Each unique personalized name may be printed once on one object or, alternatively, a number of times on a set of objects. In such an example, the dynamic content may be provided in the form of a text file or a spreadsheet listing the personalized names. The digital meshes of discrete elements for such dynamic content may include various alphanumeric characters.

In another example, recycling instructions or a recycling code may be included on each printed object. Such an object may be created using a CAD program agnostic of the material ultimately used to print the object. The object may be annotated with a location to receive recycling instructions or a recycling code. A dynamic content compositing system may create a print job to send to a 3D printer that includes instructions to print multiple copies of the object using a specified material. The print job may further include a copy of the digital mesh of the object and digital meshes of the discrete elements (or element) to print the recycling instructions in the specified location on each printed object.

In another example, the print job may include data identifying the region of interest to print date and build location information on each of a plurality of objects, which may be printed once or many times. A digital mesh of each of the plurality of objects may be sent to the 3D printer, along with one instance of the digital mesh of each discrete element to be re-used during the printing of each object with the print date and build location.

The dynamic content may, for example, include alphanumeric characters or Unicode ranges, each of which may be transmitted in the form of a digital mesh. The geometry of the digital mesh of each discrete element may comprise a 3D bounding volume, an inverted or negative space volume, or a volume (positive or negative) formed in or on a tile or other background.

As described herein, print slicing software receives the print instructions and generates printable voxels based on defined fill rules. The fill rules define how the final dynamic compositing of objects, references, and mesh components are instantiated. The final result is a dynamic composition of the digital mesh of the object and the digital mesh of the unique combination or composition of the discrete elements for the specific print job and/or for each printed object.

FIG. 1 illustrates a functional block diagram 100 of operations for dynamically compositing elements on a digital mesh for multiple unique 3D prints of an object. As illustrated, an object is created, at 110, using CAD software on, for example, a general-purpose computer. A message creation subsystem may allow a user to provide, at 120, a dynamic content (e.g., a dynamic message, date, time, serial number, production run, or the like).

A print subsystem may create, at 130, a print job that includes a single instance of the digital mesh of the object, a single instance of each digital mesh of each discrete element of the dynamic content, and compositing instructions for compositing a unique combination of the discrete elements of the dynamic content in the identified region of each printing of the object. The printer may print, at 140, multiple instances of the object with the unique dynamic content printed on each instance of the object based on the transmitted instructions and digital meshes of the discrete elements of the dynamic content.

Figure 2:
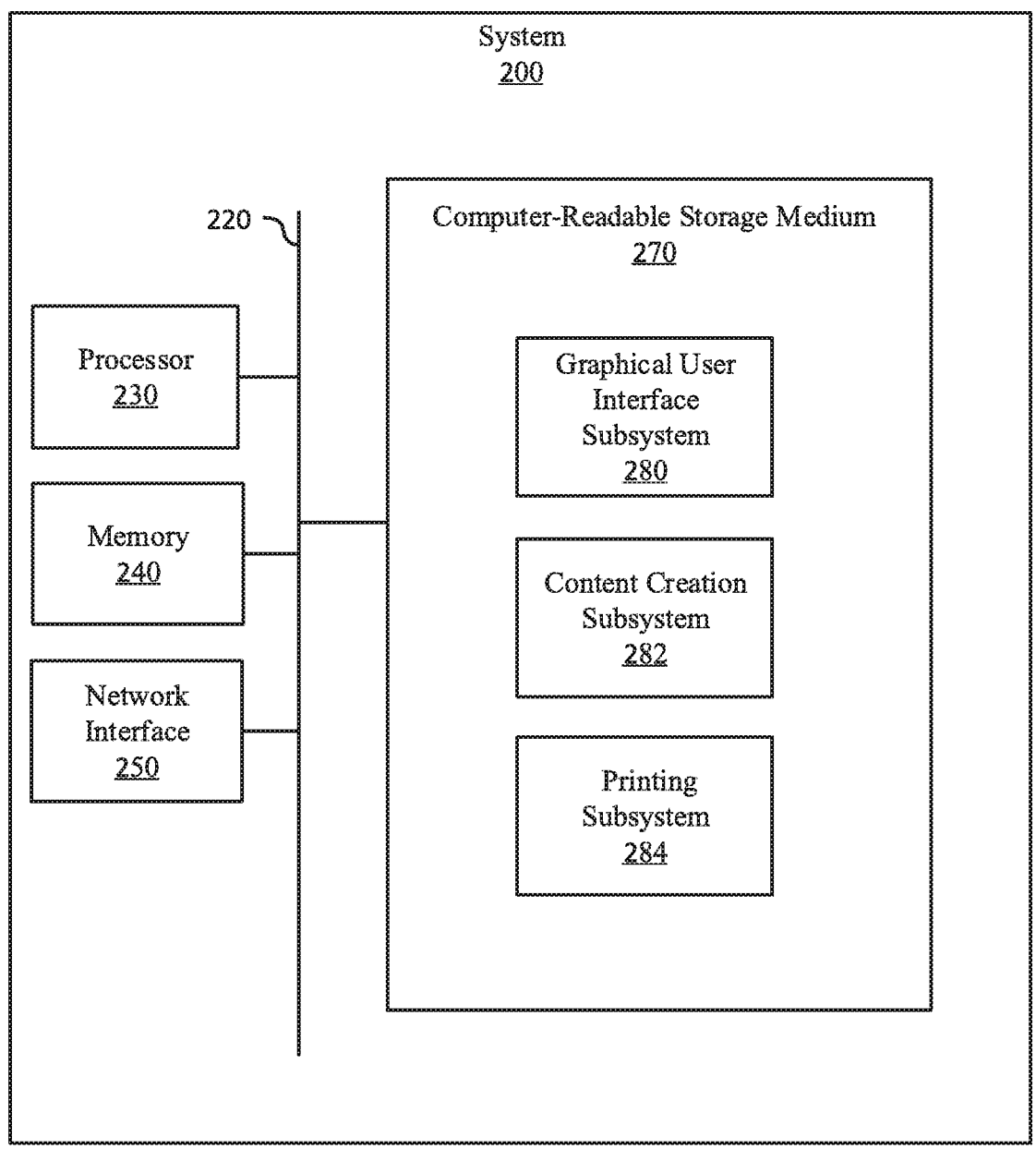
FIG. 2 illustrated a block diagram of an example computer system for controlling the compositing of elements on a digital mesh of an object for 3D printing.

FIG. 2 illustrated a block diagram of an example computer system 200 for controlling the compositing of elements on a digital mesh of an object for 3D printing. The computer system 200 may include a processor 230, a memory, 240, a network interface 250 (e.g., a wired or wireless communication interface), and a computer-readable storage medium 270 connected via a bus 220. The computer-readable medium may, for example, comprise a non-transitory computer readable medium with various subsystems implemented as hardware, firmware, and/or computer-executable instructions or modules.

For example, a graphical user interface (GUI) subsystem 280 may generate GUI to display a digital mesh of an object to be printed via a 3D printer. The GUI subsystem 280 may, for example, import and display a 2D rendering of a digital mesh of an object created in a CAD program. The GUI subsystem 280 may detect a pre-identified region of the digital mesh of the object annotated for receiving dynamic content. Alternatively, or additionally, the GUI subsystem 280 may allow a user to provide a user input identifying a region of the digital mesh of the object to receive dynamic content.

A content creation subsystem 282 may receive user-defined content to be 3D printed in the identified region during each 3D printing of the object. As described herein, the dynamic content may be specified by instructions to print a date, timestamp, serial number, or other information calculable at the time of printing. Alternatively, or additionally, the dynamic content may be specified by instructions to print each 3D object with a unique serial number, name, phrase, pattern, code, material-dependent recycling instructions, print location information, or the like. Such dynamic content may be algorithmically specified or explicitly delineated (e.g., via a spreadsheet, database, table, or list).

A printing subsystem 284 may transmit print instructions to a 3D printer (e.g., via the network interface 250). The print instructions may include a single digital mesh of the object, one instance of each digit mesh of each discrete element of the dynamic content, and compositing instructions for compositing a unique combination of the discrete elements of the dynamic content in the identified region of each printing of the object. Each time the printer prints an instance (e.g., a copy) of the object, the printer uses the compositing instructions to compose a combination of discrete elements for colocation on the identified region of the object.

The unique combination of discrete elements may be unique to each object or unique to sets of objects printed in the same location, as part of the same batch, using the same materials, at the same time, during the same day/week/year or another time period. Thus, a set of printed objects (e.g., one printed object or multiple printed object) may have a unique combination of discrete elements of the dynamic content based on the set of printed objects having a common characteristic.

Figure 3A:
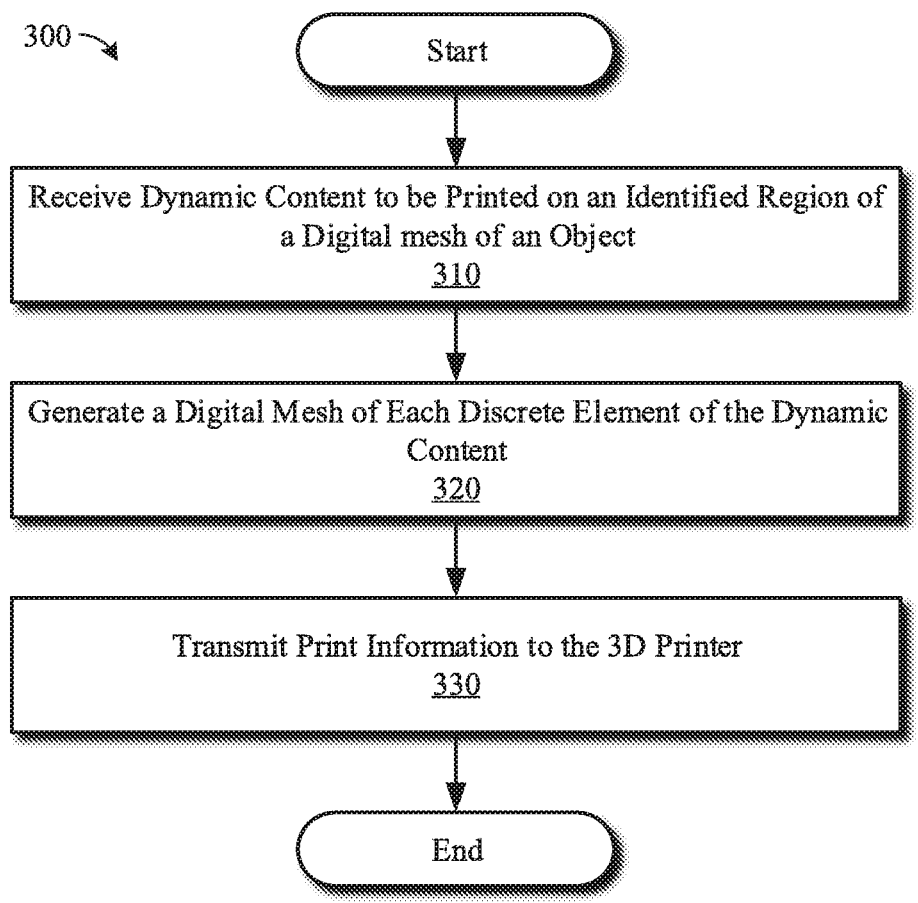
FIG. 3A illustrates a flow diagram of an example method for 3D printing an object with dynamically composited elements.

FIG. 3A illustrates a flow diagram of an example method 300 for 3D printing an object with dynamically composited elements. As illustrated, a system may receive dynamic content, at 310, to be printed on an identified region of a digital mesh of an object during 3D printings of the object. The system may generate, at 320, a digital mesh of each discrete element of the dynamic content to be 3D printed during the 3D printings of the object. The system may transmit, at 330, print information to the 3D printer. The print information may be a print job and may include printing information, including compositing instructions.

For example, the print information may include the digital meshes of the discrete elements of the dynamic content. A single instance of the digital mesh of each discrete element may be transmitted to the 3D printer for re-use by the 3D printer each time an object is printed. The print information may also include the digital mesh of the object to be re-used multiple times to print the object. The compositing instructions sent to the printer may provide instructions that define a composition of a subset of the digital meshes of the discrete elements to be printed in the identified region of the digital mesh of the object in each 3D printing of the object.

Figure 3B:
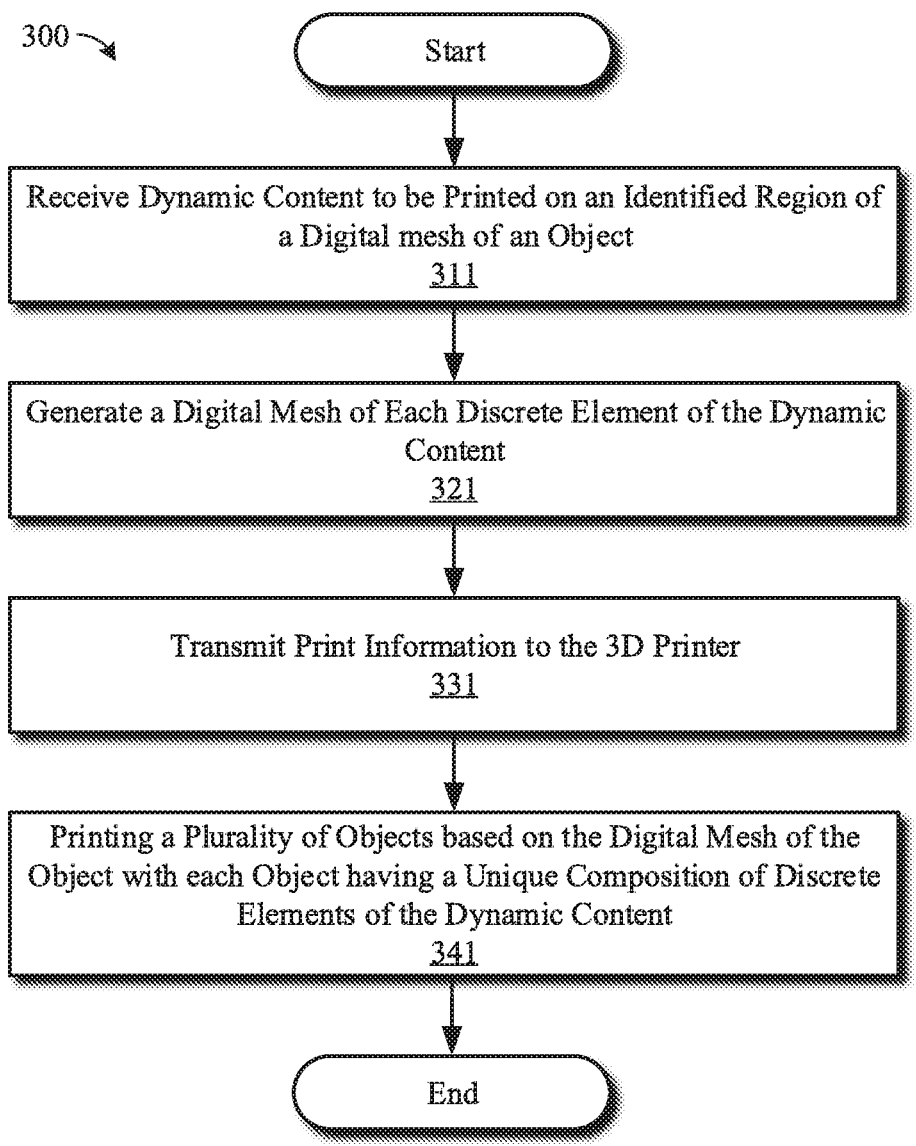
FIG. 3B illustrates a flow diagram of another example method for 3D printing an object with dynamically composited elements.

FIG. 3B illustrates a flow diagram of another example method for 3D printing an object with dynamically composited elements. A system may receive, at 311, dynamic content to be printed on an identified region of a digital mesh of an object during 3D printings of the object. The system may generate, at 321, a digital mesh of each discrete element of the dynamic content to be 3D printed during the 3D printings of the object. The system may transmit, at 331, print information to the 3D printer. The print information may be a print job and may include printing information, including, as described above, compositing instructions, digital meshes of the discrete elements of the dynamic content, and a digital mesh of the object to be printed. In some examples, the system may be integral with a 3D printer and further perform slicing of the composited digital meshes (e.g., slicing the digital mesh of the object and the digital meshes of the discrete elements of the dynamic content spatially positioned with respect to the digital mesh of the object).

In some examples, the system may scale, rotate, and/or reposition the digital meshes of the discrete elements of the dynamic content to fit within or on the identified region of the object. Using a two-digit week code as an example, the print instructions may include digital meshes of the numerals 0-9 that are dynamically composited on an identified region of the digital mesh of an object at the time of printing. The system determines the week of the year (e.g., 01-52) and spatially positions the applicable two digital meshes of the numerals. The digital meshes of the numerals may be relatively larger or smaller than the region of the digital mesh of the object annotated for the two-digit week code label. Accordingly, the system may scale the digital meshes of the numerals such that the composition of the two digits fits within the identified region. Similarly, the system may spatially rotate the two digits in 3D space to intersect the surface of the identified region on the digital mesh of the object.

The system may operate to cause the 3D printer to print, at 341, a plurality of objects based on the digital mesh of the object. Each printed object (e.g., set of printed objects) may have a unique composition of discrete elements in the identified region of the object (or each object in the set) based on the compositing instructions. The 3D printer may slice the composited digital meshes, including the digital mesh of the object to be printed and the digital meshes of the discrete elements of the dynamic content that are spatially positioned according to the compositing instructions.

Figure 4:
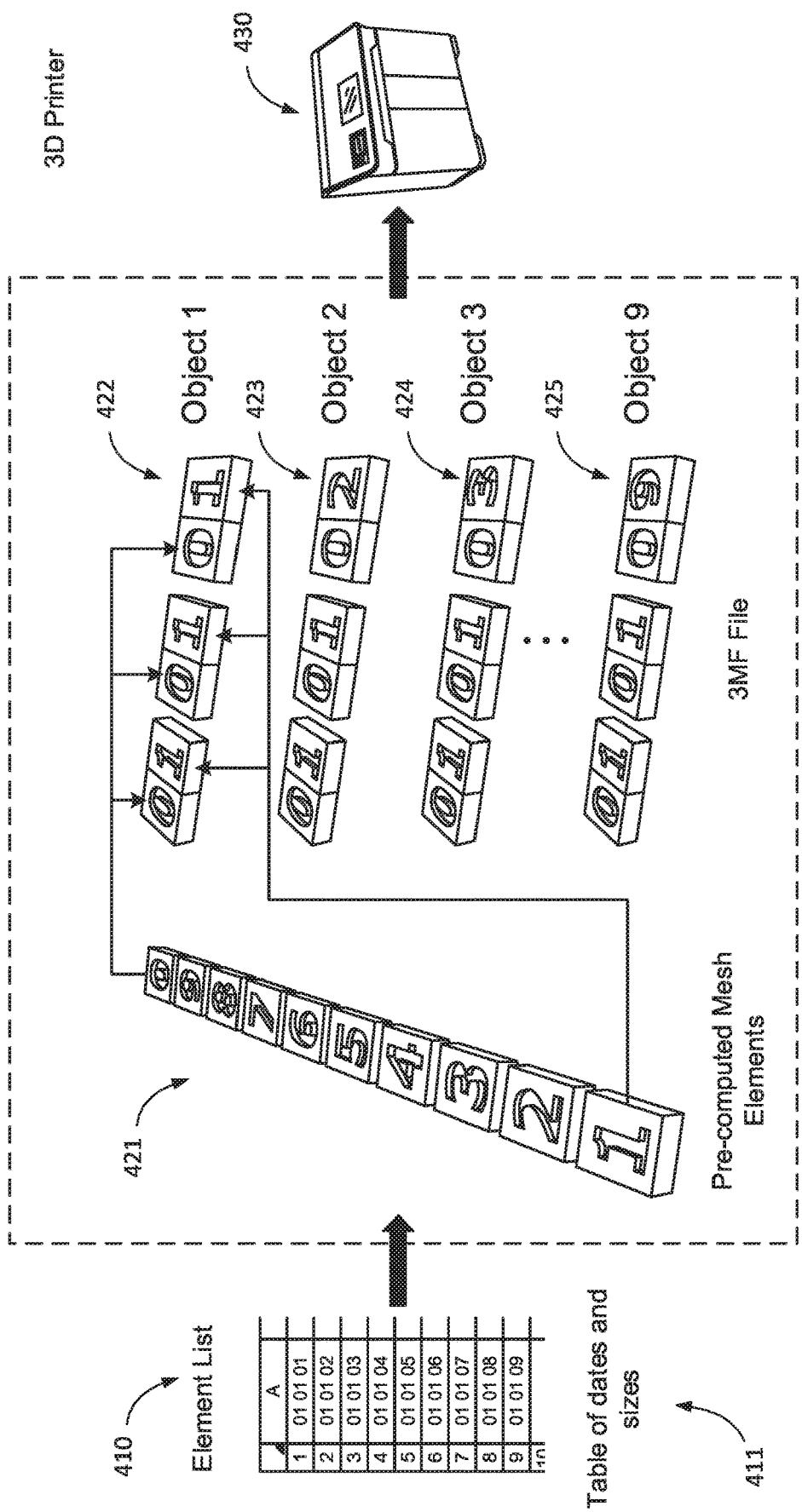
FIG. 4 illustrates an example of an element list and corresponding digital meshes used for dynamic element compositing on an object during sequential prints.

FIG. 4 illustrates an example of an element list 410 and corresponding digital meshes 421 used for dynamic element compositing on an object during sequential (or parallel) prints of the object. In the illustrated example, the element list 410 of the dynamic content is provided in the form of a table 411 of dates and sizes. The system may generate digital meshes 421 of each discrete element (e.g., numerals 0-9) of the dynamic content. As per the compositing instructions of the element list 410, a composition of the digital meshes 421 of the discrete elements is used to form the numerical sequence "01 01 01" for spatial positioning with respect to an identified region of the digital mesh of the first object 422.

Similarly, the compositing instructions of the element list 410 direct the system to composite the digital meshes 421 of the discrete elements to form the numerical sequence "01 01 02" for spatial positioning with respect to the digital mesh of the second object 423. The compositing instructions of the element list 410 direct the system to composite the digital meshes 421 of the discrete elements to form the numerical sequence "01 01 03" for spatial positioning with respect to the digital mesh of the third object 424. The compositing instructions of the element list 410 direct the system to composite the digital meshes 421 of the discrete elements to form the numerical sequence "01 01 09" for spatial positioning with respect to the digital mesh of the ninth object 425.

Any of a wide variety file formats suitable for additive manufacturing may be used to encapsulate the digital mesh of the object, the digital meshes of the discrete elements of the dynamic content, and/or the compositing instructions for where to spatially position the compositions of the digital meshes of the discrete elements of the dynamic content with respect to the digital mesh of the object. In various examples, and as illustrated in FIG. 4, the 3D Manufacturing Format (3MF) file format, or proprietary adaptations thereof may be utilized to send the print information to the 3D printer 430.

Figure 5A:
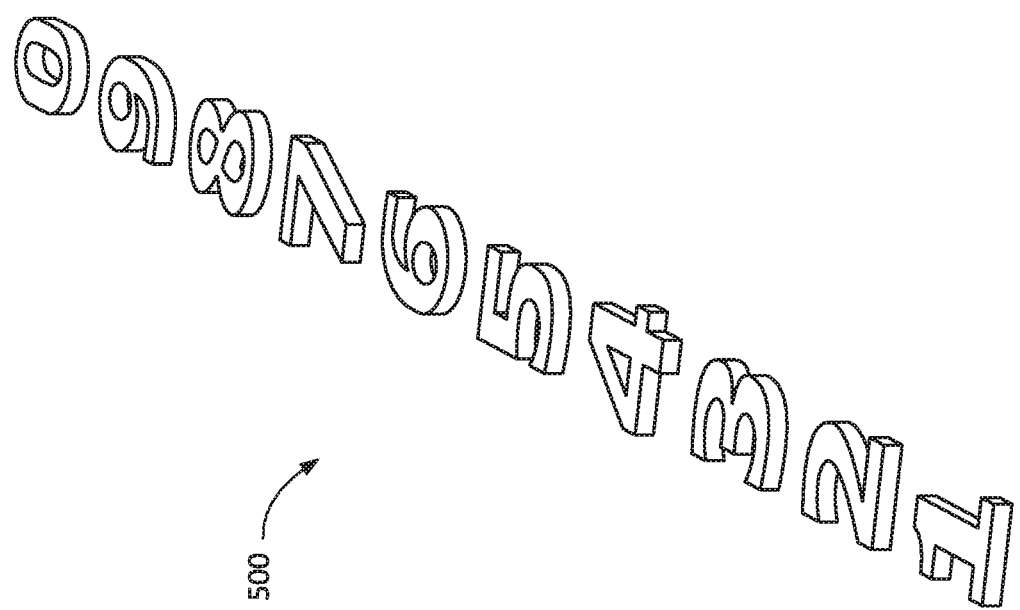
FIG. 5A illustrates example digital meshes of solid numerals to be dynamically composited on an object during 3D printing.

FIG. 5A illustrates example digital meshes of solid numerals 500 to be dynamically composited on an object during 3D printing.

Figure 5B:
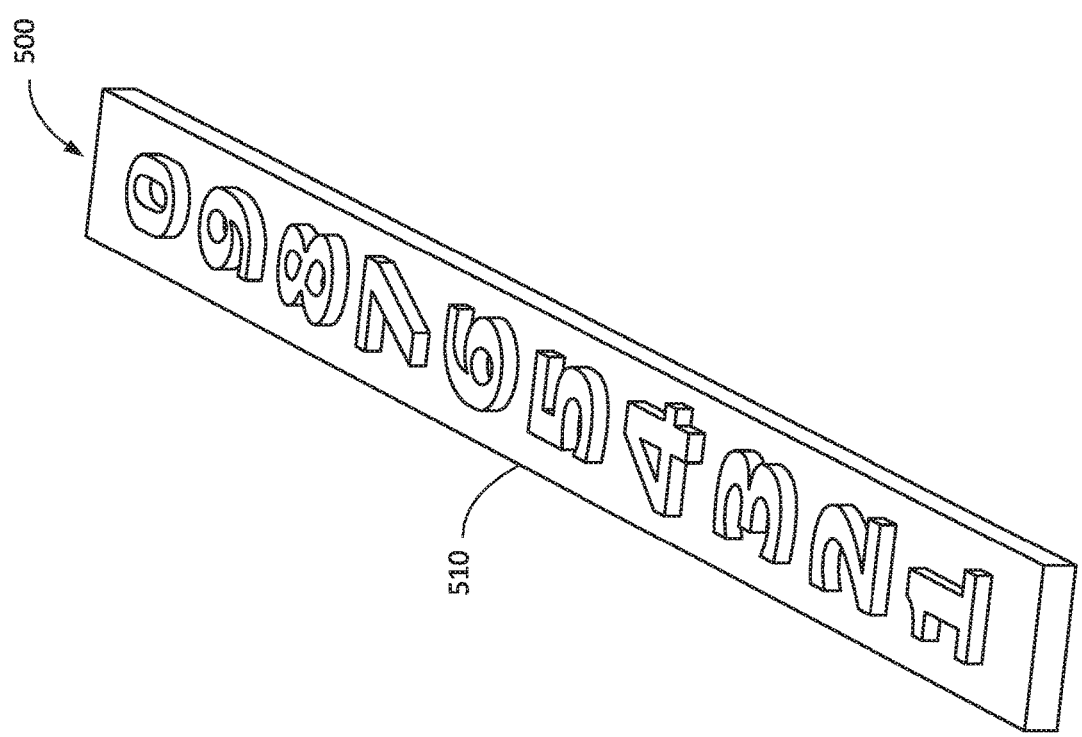
FIG. 5B illustrates the solid letters dynamically composited on an example 3D-printed object as raised elements.

FIG. 5B illustrates the digital meshes of the solid letters 500 dynamically composited on an example 3D-printed object 510 (e.g., a block) as raised elements. In some examples, the digital meshes of the solid letters 500 may be spatially positioned slightly within the digital mesh of the object 510 or positioned in contact with the surface of the digital mesh of the object 510.

Figure 6A:
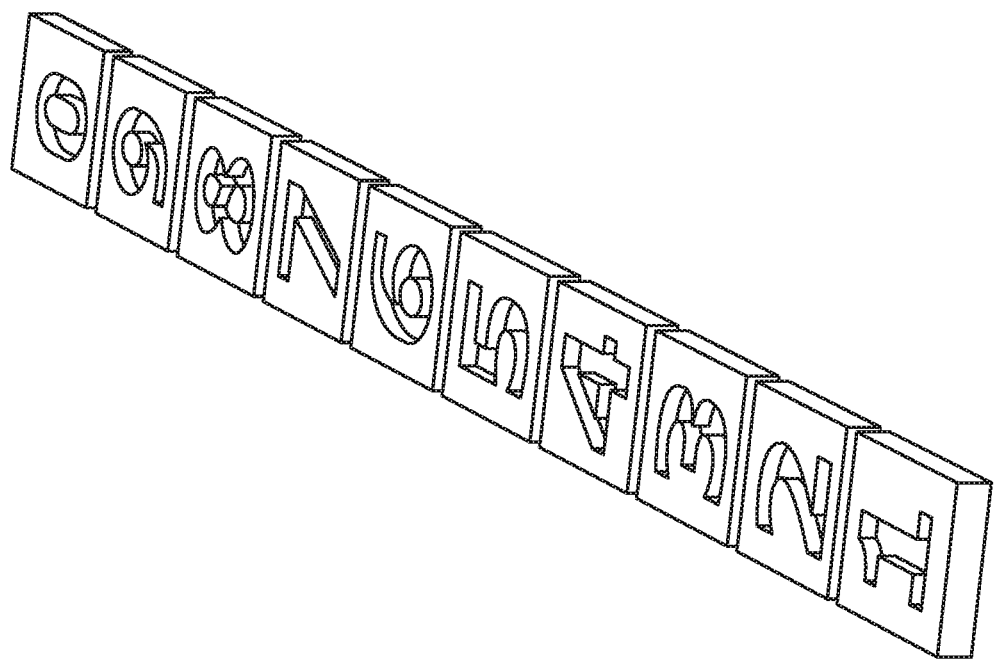
FIG. 6A illustrates an example of digital meshes of tiles with engraved numerals to be dynamically composited on an object during 3D printing.
Figure 6A:

FIG. 6A illustrates an example of digital meshes of tiles 600 with engraved numerals to be dynamically composited on an object during 3D printing.

Figure 6B:
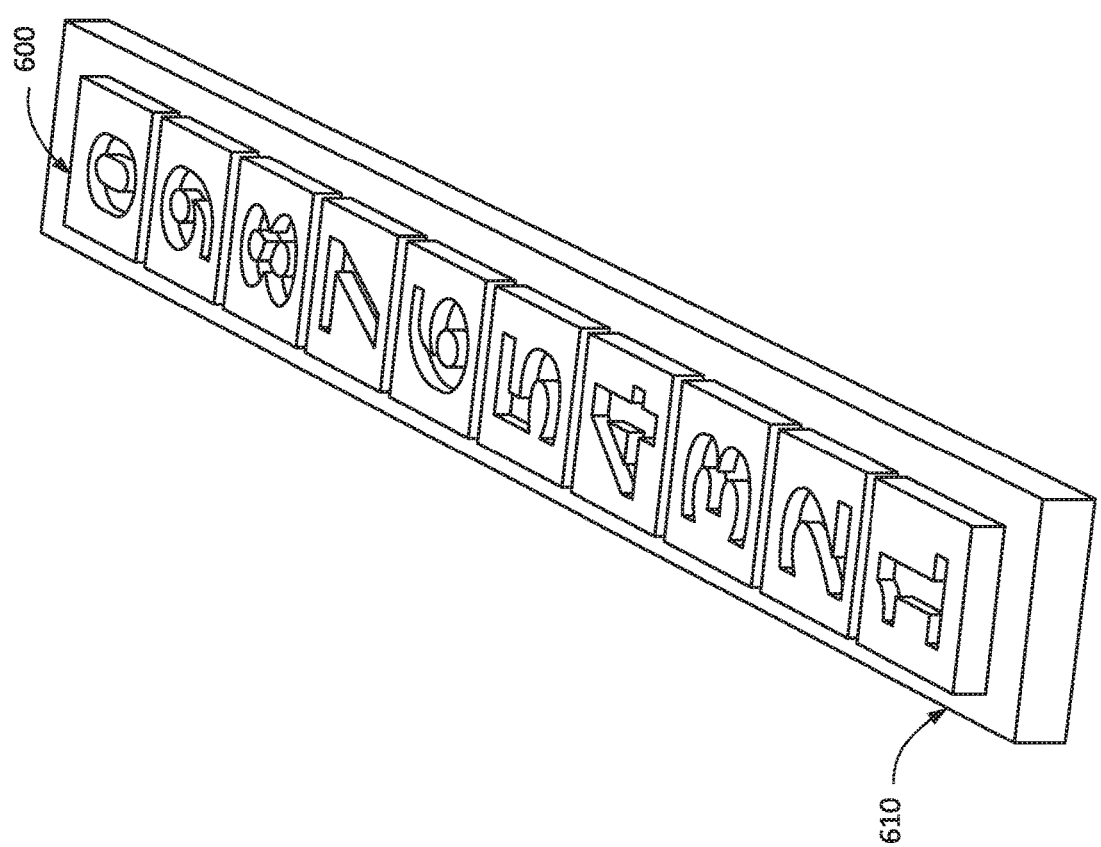
FIG. 6B illustrates the engraved tiles dynamically composited on a surface of an example 3D-printed object.

FIG. 6B illustrates the digital meshes of the engraved tiles 600 dynamically composited on a surface of an example 3D-printed object 610. The compositing instructions may direct the digital meshes of the engraved tiles 600 to be spatially positioned on the surface of the digital mesh of the object 610, as illustrated. Alternatively, the digital meshes of the engraved tiles 600 may be partially embedded within the surface of the digital mesh of the object 610.

Figure 7A:
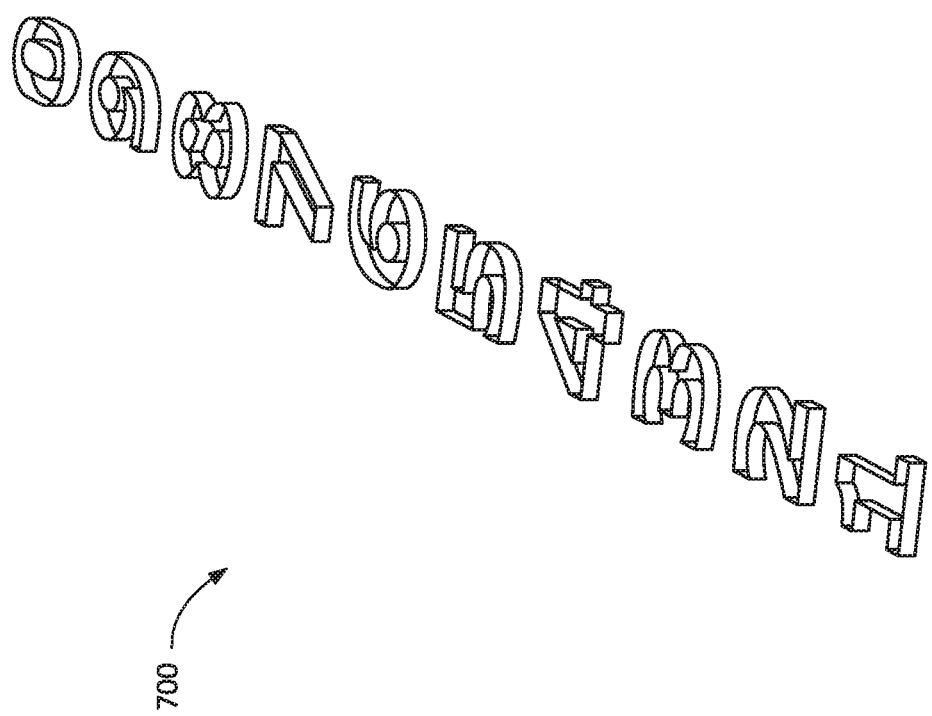
FIG. 7A illustrates an example of negative space digital meshes of numerals to be dynamically composited on an object during 3D printing.

FIG. 7A illustrates an example of negative space digital meshes 700 of numerals to be dynamically composited on an object during 3D printing. The negative space digital meshes 700 operate to subtract from the positive space (normal) digital mesh of an object.

Figure 7B:
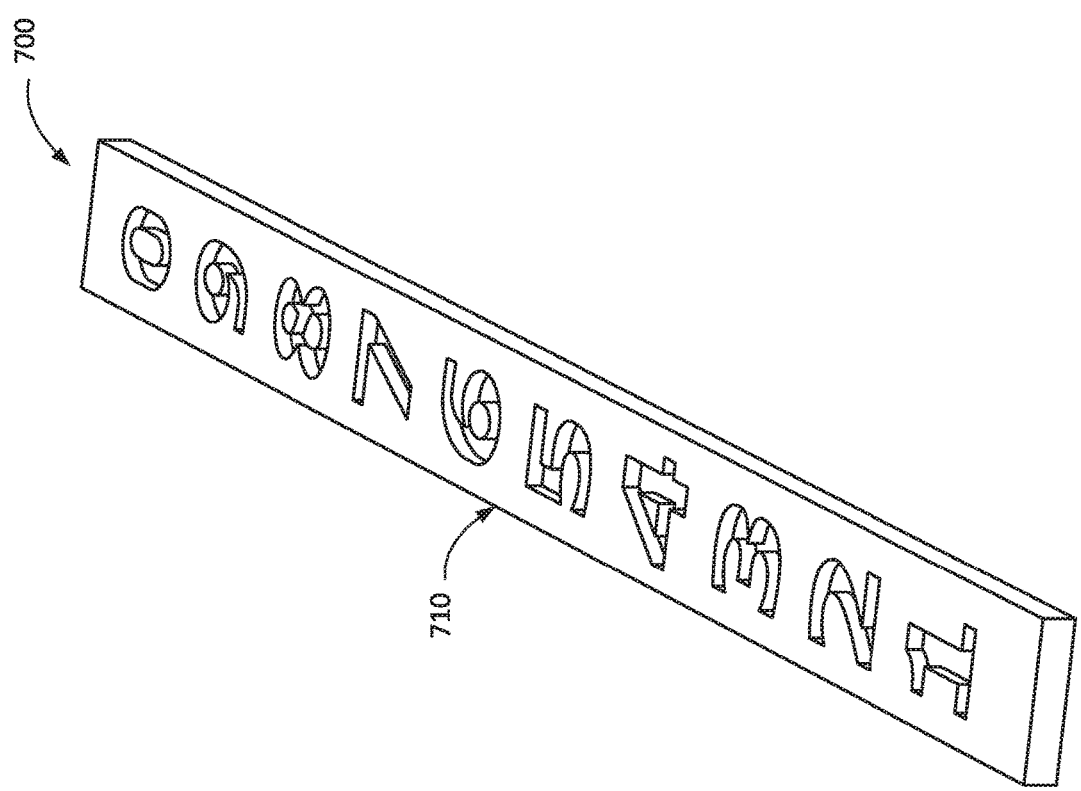
FIG. 7B illustrates an example 3D-printed object generated by compositing the negative space digital meshes of the numerals with the digital mesh of the object to be 3D printed.

FIG. 7B illustrates an example 3D-printed object generated by compositing the negative space digital meshes 700 of the numerals with the digital mesh of the object 710 to be 3D printed. The positive space digital mesh of the object 710 is effectively engraved with the negative space digital meshes 700 by positioning the negative space digital meshes 700 into the surface of the digital mesh of the object 710. For example, the negative space digital meshes 700 may be positioned with an upper surface flush with the upper surface of the digital mesh of the object 710. Alternatively, for a shallower engraving, the upper surface of the negative space digital meshes 700 may be positioned slightly above the upper surface of the digital mesh of the object 710.

In other examples, the upper surface of the negative space digital meshes 700 may be positioned slightly below the upper surface of the digital mesh of the object 710, such that a void is formed within the digital mesh of the object 710. However, the distance between the top of the void and the surface of the digital mesh of the object 710 may be selected to be less than the print resolution of the 3D printer, such that no material is printed between the void and surface of the digital mesh of the object 710

While many of the illustrated examples involve numerals, it is appreciated that similar positive space digital meshes, engraved tile digital meshes, or negative space digital meshes may be used for other types of dynamic content. Examples of alternative types of dynamic content are described herein and include, but are not limited to, discrete elements of numerals, letters, punctuation, alphanumeric characters, symbols, patterns, images, glyphs textures, or the like.

Specific examples of the disclosure are described above and illustrated in the figures. It is, however, appreciated that many adaptations and modifications can be made to the specific configurations and components detailed above. In some cases, well-known features, structures, and/or operations are not shown or described in detail. Furthermore, the described features, structures, or operations may be combined in any suitable manner. It is also appreciated that the components of the examples as generally described, and as described in conjunction with the figures herein, can be arranged and designed in a wide variety of different configurations. Thus, all feasible permutations and combinations of examples are contemplated. Furthermore, it is appreciated that changes may be made to the details of the above-described examples without departing from the underlying principles thereof.

In the description above, various features are sometimes grouped together in a single example, figure, or description thereof for the purpose of streamlining the disclosure. This method of disclosure, however, is not to be interpreted as reflecting an intention that any claim now presented or presented in the future requires more features than those expressly recited in that claim. Rather, it is appreciated that inventive aspects lie in a combination of fewer than all features of any single foregoing disclosed example. The claims are hereby expressly incorporated into this Detailed Description, with each claim standing on its own as a separate example. This disclosure includes all permutations and combinations of the independent claims with their dependent claims.

What is claimed is:

1. A method, comprising:
receiving dynamic content to be printed on an identified region of a digital mesh of an object during three-dimensional (3D) printings of the object;
generating a digital mesh of each discrete element of the dynamic content to be 3D printed during the 3D printings of the object;
transmitting print information to a 3D printer that includes:
(i) the digital meshes of the discrete elements of the dynamic content,
(ii) the digital mesh of the object, and
(iii) instructions defining a unique composition of a subset of the digital meshes of the discrete elements to be dynamically composited during printing and printed in the identified region of the digital mesh of the object in each 3D printing of the object, wherein the instructions includes geometrically transforming instructions for scaling and/or rotating at least one of the digital meshes of the discrete elements during printing based on fitting the at least one digital mesh of the discrete element within the identified region of the digital mesh of the object at which the discrete element is to be printed; and
printing a plurality of objects based on the digital mesh of the object, with each object having a unique composition of discrete elements in the identified region of the object based on the instructions.

2. The method of claim 1, further comprising:
for each 3D printing of the object, the 3D printer slicing composited digital meshes of the discrete elements and the digital mesh of the object.

3. The method of claim 1, further comprising:
implementing a geometric transformation of the composition of the subset of the digital meshes of the discrete elements to be printed in the identified region of the digital mesh of the object.

4. The method of claim 1, wherein receiving the dynamic content comprises receiving a list of dynamic messages to be printed in the identified region during each 3D printing of the object.

5. The method of claim 1, wherein generating the digital mesh of each discrete element of the dynamic content comprises generating a digital mesh of a tile with an engraving of the discrete element.

6. The method of claim 1, wherein generating the digital mesh of each discrete element of the dynamic content comprises generating a negative space digital mesh of each discrete element.

7. A dynamic content compositing system, comprising:
a graphical user interface (GUI) subsystem to generate a GUI to:
display a digital mesh of an object to be printed via a three-dimensional (3D) printer, and
receive a user input identifying a region of the digital mesh to receive dynamic content;
a content creation subsystem to receive user-defined dynamic content to be 3D printed in the identified region during each 3D printing of the object;
a printing subsystem to transmit print instructions to a 3D printer, wherein the print instructions include:
a single digital mesh of the object,
a digital mesh of each discrete element of the dynamic content, and
compositing instructions for compositing a unique combination of the discrete elements of the dynamic content in the identified region of each printing of the object, wherein the compositing instructions includes geometric transformation instructions for geometrically transforming the unique combination of discrete elements to be printed in the identified region of each printing of the object such that the geometric transformation information includes scaling and rotating instructions for scaling and/or rotating the unique combination of discrete elements based on fitting the unique combination of discrete elements within the identified region of the digital mesh of the object at which the unique combination of discrete element is to be printed; and the 3D printer printing a plurality of objects based on the digital mesh of the object, with each object having a unique composition of discrete elements in the identified region of the object based on the instructions.

8. The system of claim 7, wherein the geometric transformation information comprises scaling instructions and rotation instructions.

9. The system of claim 7, wherein the dynamic content comprises a two-digit week code identifying the week of the year that each object was printed.

10. The system of claim 7, wherein the dynamic content comprises at least one of: text, an image, a pattern, a date, a serial number, a model number, a batch number, and personalization information.

11. A non-transitory computer-readable medium with instructions stored thereon that, when implemented by a three dimensional (3D) printer, cause the 3D printer to receive printing instructions that include:

a digital mesh of an object with a region thereof identified to receive dynamic content;

instructions to print multiple instances of the object, wherein each printed object is to include a unique combination of discrete elements of the dynamic content on the identified region;

digital meshes of each discrete element of the dynamic content;

compositing instructions defining the unique combination of discrete elements to be printed on each 3D-printed instance of the object, wherein the instructions includes geometric transformation instructions for geometrically transforming the unique combination of discrete elements to be printed in the identified region of each printing of the object such that the geometric transformation information includes scaling and rotating instructions for scaling and/or rotating the discrete elements based on fitting the unique combination of discrete elements within the identified region of the digital mesh of the object at which the unique combination of discrete element is to be printed; and the 3D printer printing a plurality of objects based on the digital mesh of the object, with each object having a unique composition of discrete elements in the identified region of the object based on the instructions.

* * * * *